Sweeney Mathews & Hartley,
Glass Molds.

Nº 52,338.      Patented Jan. 30, 1866.

Witnesses

Inventors

UNITED STATES PATENT OFFICE.

MICHAEL SWEENEY, J. E. MATHEWS, AND THOMAS HARTLEY, OF WHEELING, WEST VIRGINIA.

IMPROVEMENT IN GLASS-MOLDS.

Specification forming part of Letters Patent No. 52,338, dated January 30, 1866.

*To all whom it may concern:*

Be it known that we, MICHAEL SWEENEY, JAMES E. MATHEWS, and THOMAS HARTLEY, of Wheeling, in the county of Ohio and State of West Virginia, have invented a new and useful Improvement in Molds for Glass; and we do hereby declare that the following is a full, clear, and exact description thereof, which will enable others skilled in the art to make and use the same, reference being had to the accompanying drawings, forming part of this specification, in which—

Figure 1:
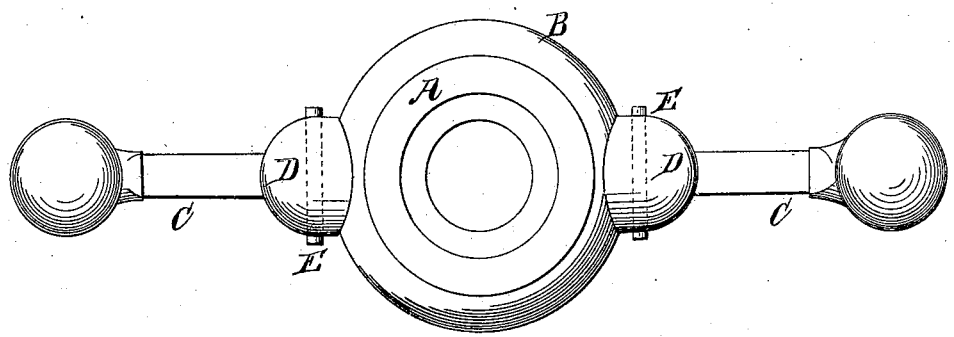
Figure 2:
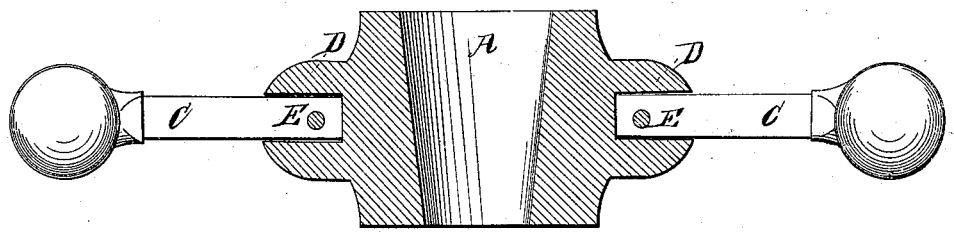
Figure 3:
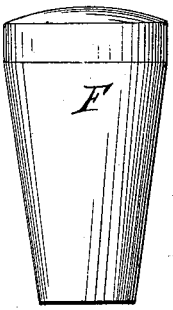

Figure 1 is a plan of a mold made according to our invention. Fig. 2 is a vertical section. Fig. 3 is an elevation of a core on which the mold is cast.

Similar letters of reference indicate like parts.

The object of this invention is, among other things, to produce a better surface for glass-molds, to secure an equalization and uniformity in the heat of the mold while glass is being pressed therein, and to obtain greater facility in handling the mold.

The invention consists, among other things, in casting the mold round a cast-iron or steel chill, instead of round a sand core, as in the ordinary way, which secures a uniform density in the body of the mold and produces a surface fully equal, if not superior, to cast-steel, while it does not prevent the use of ordinary tools in finishing the inside of the mold.

It also consists in the shape given to the mold, which is made of increased thickness in the center, in order to secure the equalization of heat throughout its mass while the glass is being pressed. This equalization and uniformity in heat, together with the smoothness of surface produced inside the mold by the use of the iron or steel chill in casting, prevents the glass from sticking, as it does in molds now in use.

It consists, further, in attaching the handles to the mold by securing their ends in sockets cast in it, pins being passed through the outsides of the sockets and through the inclosed ends of the handles.

This improvement in making the molds is found to work admirably in practice, and to remove or obviate the difficulties usually met with in using molds made in the ordinary ways, while a better surface is given to the glass.

In this example of our invention A represents a mold of proper form for making tumblers. Its exterior is formed with an enlargement, B, which extends all around its circumference at about the middle of its height, for the purpose of increasing the mass of the mold, and thereby equalizing the heat therein.

At opposite points on the exterior of the mold we make projections D D, in which we form, in the process of casting, sockets of suitable shape and size to receive the ends of handles C C, by means of which the mold is handled. The projections, as well as the handles, are perforated to allow the insertion of pins E E, which serve to attach the handles securely to the mold.

When a mold is cast around a sand core its surface is comparatively soft and uneven or porous, so that when finished in the best possible manner it yet has not a suitable surface for the work designed. We therefore cast the mold around a cast-iron or steel chill, F, Fig. 3, and are thereby enabled to obtain a hard smooth surface suitable for molding glass. This invention is applicable to all kinds and forms of glass-molds.

We claim as new and desire to secure by Letters Patent—

1. The application, in making molds for glass, of cast-iron or steel chills to their interior surfaces in casting, substantially as and for the purpose above set forth.

2. Forming an enlargement around the middle of the mold, in order to obtain the equalization of heat in the mold while glass is being pressed therein, substantially as set forth.

3. The manner, substantially as above shown, of attaching handles to molds for glass.

MICHAEL SWEENEY.
   JAMES E. MATHEWS.
   THOMAS HARTLEY.

Witnesses:
 WM. IRWIN, Sr.,
 H. C. COTTS.